United States Patent [19]

Oakey

[11] Patent Number: 5,031,966
[45] Date of Patent: Jul. 16, 1991

[54] WHEEL COVER

[76] Inventor: Douglas L. Oakey, 32332 N. River Rd., Mount Clemens, Mich. 48045

[21] Appl. No.: 440,818

[22] Filed: Nov. 24, 1989

[51] Int. Cl.$^5$ ............................................... B60B 7/02
[52] U.S. Cl. .................................. 301/37 P; 301/37 R; 301/63 R
[58] Field of Search .............. 301/37 R, 37 P, 63 PW, 301/6 CS, 6 R, 65, 63 R, 63 DD; 188/264 W, 264 AA

[56] References Cited

U.S. PATENT DOCUMENTS 3,029,909  4/1962  Thomas ........................... 188/264 W
3,669,501  6/1972  Derleth ......................... 301/63 R X
3,915,502  10/1975  Connell ............................. 301/37 R
4,398,770  8/1983  Smith ............................. 301/37 P X
4,416,926  11/1983  Maglio ......................... 301/37 P X

FOREIGN PATENT DOCUMENTS 1051843  12/1966  United Kingdom ............. 301/6 CS Primary Examiner—Russell D. Stormer

[57] ABSTRACT

A combination steel and aluminum wheel comprises a roll-formed steel rim, a stamped steel spider, a cast aluminum element disposed in spaced relation to the axially outer face of the wheel, and a structural adhesive disposed between the aluminum element and both the spider and the rim of the wheel.

2 Claims, 1 Drawing Sheet

WHEEL COVER

BACKGROUND OF THE INVENTION

The present invention relates generally to vehicle wheels and particularly to an improved combination steel and aluminum vehicle wheel.

A typical automobile wheel comprises an annular, tire-supporting rim that is welded to a central spider. The spider mounts to an axle of the automobile. Both the rim and the spider are typically made from steel with the rim being roll formed and the spider being stamped.

In use, a vehicle wheel is continuously subjected to forces tending to deform the rim from its initial circular shape. Circumferential deformation of the rim is induced by the vertical component of vehicle load as well as by severe road conditions, e.g., bumps, potholes, etc. Since the wheel spider experiences a relatively small amount of deformation, a bending moment is induced at the welded juncture of the spider and rim. Thus, such known wheels must rely solely on the strength of the steel spider, rim, and the weld therebetween.

Recent emphasis on high performance vehicles has created a need for a wheel configuration that is extremely strong yet effects cooling of the vehicle braking system. Cast aluminum wheels exhibit relatively efficient heat transfer characteristics and, in addition, are often provided with integral fins that function as fan blades to induce a flow of cooling air over the brake drum or disc. However, such wheels are inherently weaker than steel wheels and the cost of such wheels is a high multiple of the cost of a steel wheel. While fan characteristics can be molded into current plastic wheel covers, such covers do nothing to augment wheel strength.

SUMMARY OF THE INVENTION

Set in the above context, an important advantage of the present invention is that the advantages of both the steel and aluminum wheels are combined in a synergistic manner. Maximum benefit is taken of the cost and strength characteristics of a steel wheel. Maximum advantage is taken of the heat dissipation characteristics of cast aluminum wheels. Specifically, a cast aluminum outer element and the conventional steel wheel are combined in a manner that augments the strength of the wheel by forming what is essentially a radial truss.

Additional features and advantages of the invention will be seen from the following detailed description.

DETAILED DESCRIPTION OF THE PREFERRED EMBODIMENT OF THE INVENTION

Figure 1:
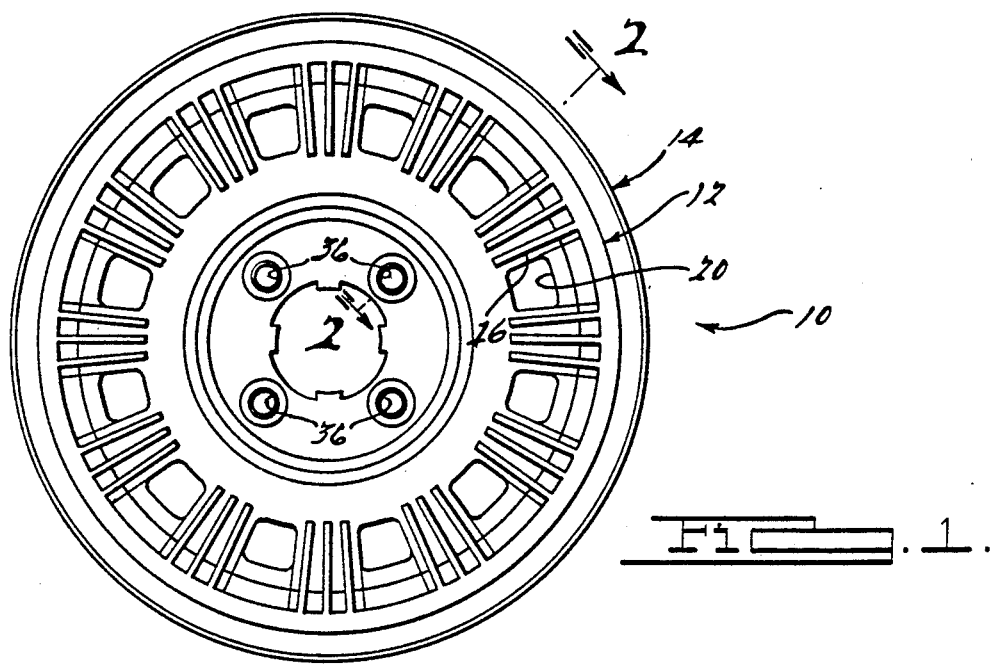
FIG. 1 is a front view of the axially outer face of a vehicle wheel of the present invention.
Figure 2:
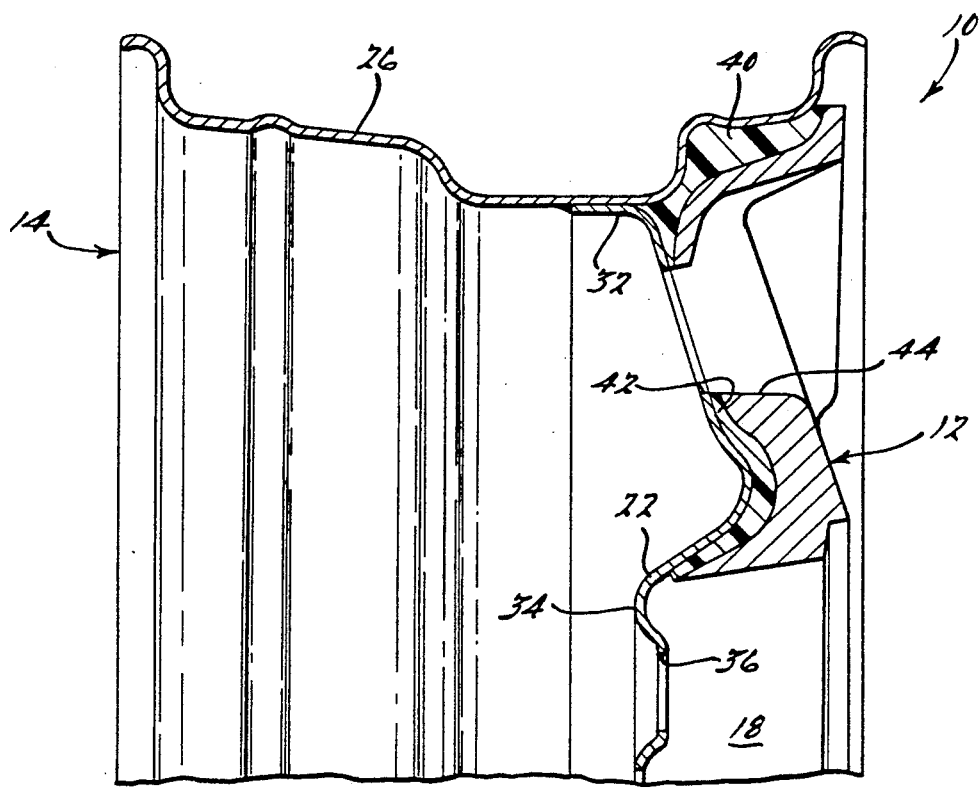
FIG. 2 is an enlarged sectional view taken in the direction of arrows 2—2 in FIG. 1.

As seen in the drawings, a combination steel and aluminum vehicle wheel 10 comprises a functional die cast aluminum outer element 12 that is adhesively bonded to a conventional steel wheel 14. The aluminum element 12 includes a plurality of air flow inducing fins or ribs 16 which extend radially and axially inwardly from substantially the outer perimeter of the wheel 10 as well as a plurality of air flow apertures 20.

The steel portion 14 of the wheel 10 comprises a wheel spider 22 and a multiflanged annular rim 26. The spider 22 includes a radially outer axially extending terminal flange 32 that is telescoped within the inner periphery of the wheel rim 26 and is affixed thereto by welding. The spider 22 has a centrally disposed radial flange 34 adapted to be affixed to a brake drum or mounting hub of a vehicle axle (not shown). Four attachment holes 36 are arranged 90° apart on the radial flange 34 for the acceptance of conventional bolts (not shown).

In accordance with the present invention, two radially spaced annular layers 40 and 42 of high durometer, high density structural adhesive, for example, polyurethane, are disposed between the rim and spider portions 26 and 22, respectively, of the steel wheel 14 and the aluminum element 12 to adhesively mount the element 12 to wheel 14. The polyurethane layer is relatively high durometer, for example Shore A 110, and sufficiently thick, for example 0.100 inch, so as to transfer loads on the rim 26 to the element 12 thence to the spider 22 thereby to preclude deformation to which both the rim 26 and spider 22 of the wheel assembly 10 would otherwise be subjected. The polyurethane layers 40 and 42 are capable of retaining their physical characteristics over the customary temperature extremes to which an automobile wheel is typically subjected, for example, minus 40° F. to 180° F. Preferably, the polyeurethane layers 40 and 42 are annular and extend over a substantial portion of the rim 24 and spider 22. Thus, the aluminum element 12 functions as a truss so as to lend structural support to the steel wheel portion 14 to preclude deformation thereof. Stated in another manner, the fact that the element 12 spans the welded junction of the spider 22 to the rim 26 and is permanently bonded thereto by a high strength adhesive renders the element 12 load bearing so as to maximize strength of the wheel 10.

With the present invention, heat transfer from the vehicle brakes to ambient air is increased since full advantage can be taken of functional cast wheel designs that augment convective heat transfer from the vehicle brakes.

While it is apparent that the preferred embodiment of the invention disclosed is well calculated to fulfill the objects above stated, it will be appreciated that the invention is susceptible to modification, variation, and change without departing from the spirit thereof.

I claim:

1. A combination steel and aluminum vehicle wheel comprising
   a steel spider,
   a steel rim, welded to said spider
   a relatively thick cast aluminum structural element disposed on an axially outer face of the wheel in spaced relation thereto, and
   a structural adhesive disposed between both the spider and the rim of the wheel and said element whereby said element functions to support said spider and rim against radial deformation.

2. The wheel of claim 1 wherein said heat transfer element has a plurality of circumferentially spaced radially extending cooling fins to induce air

* * * * *